United States Patent
Platt et al.

(10) Patent No.: US 12,420,226 B2
(45) Date of Patent: Sep. 23, 2025

(54) FLUOROPLASTIC SUPPORT MEMBRANE

(71) Applicant: DelStar Technologies, Inc., Middletown, DE (US)

(72) Inventors: Andrew G. Platt, Middletown, DE (US); Ronald Federico, Chadds Ford, PA (US); Joel Patrick Trojnar, Smyrna, PA (US)

(73) Assignee: DelStar Technologies, Inc.

( * ) Notice: Subject to any disclaimer, the term of this patent is extended or adjusted under 35 U.S.C. 154(b) by 577 days.

(21) Appl. No.: 17/626,562

(22) PCT Filed: Jul. 6, 2020

(86) PCT No.: PCT/US2020/040941
§ 371 (c)(1),
(2) Date: Jan. 12, 2022

(87) PCT Pub. No.: WO2021/011217
PCT Pub. Date: Jan. 21, 2021

(65) Prior Publication Data
US 2022/0258090 A1 Aug. 18, 2022

Related U.S. Application Data

(60) Provisional application No. 62/873,374, filed on Jul. 12, 2019.

(51) Int. Cl.
*B01D 46/52* (2006.01)
*B01D 46/12* (2022.01)
(Continued)

(52) U.S. Cl.
CPC .............. *B01D 46/52* (2013.01); *B01D 46/12* (2013.01); *B01D 69/10* (2013.01); *B01D 69/12* (2013.01); *B01D 2201/0415* (2013.01)

(58) Field of Classification Search
CPC ........ B01D 46/52; B01D 46/12; B01D 69/10; B01D 69/12; B01D 2201/0415;
(Continued)

(56) References Cited

U.S. PATENT DOCUMENTS

| 5,798,049 A | 8/1998 | Proulx et al. |
| 7,347,937 B1 | 3/2008 | Cheng et al. |

(Continued)

FOREIGN PATENT DOCUMENTS

| CN | 101039738 A | 9/2007 |
| CN | 106794590 A | 5/2017 |

(Continued)

OTHER PUBLICATIONS

Japan Patent Office (JPO) Office Action dated Mar. 18, 2024; Japanese Patent Application No. 2022-502049.
(Continued)

*Primary Examiner* — Waqaas Ali
(74) *Attorney, Agent, or Firm* — Farber LLC

(57) ABSTRACT

Support membranes for filters are described that include a support sheet formed of a polymeric material and a continuous base section having opposed outer surfaces and spaced-apart ribs extending outwardly from at least one of the opposed outer surfaces. The spaced-apart ribs define continuous flow channels bound by the adjacent spaced-apart ribs. The ratio of the height of the ribs to the height of the continuous base ranges from about 2:1 to about 5:1. This relatively high aspect ratio of the ribs and the base layer increases the performance of the filter and reduces the cross-flow pressure drop of fluids filtered through the membrane.

13 Claims, 7 Drawing Sheets

(51) Int. Cl.
*B01D 69/10* (2006.01)
*B01D 69/12* (2006.01)

(58) Field of Classification Search
CPC ........ B01D 46/62; B01D 29/05; B01D 29/13; B01D 2325/02; B01D 2325/04; B01D 71/32; B01D 69/06; B01D 69/107; B01D 69/1213
See application file for complete search history.

(56) References Cited

U.S. PATENT DOCUMENTS

| | | | |
|---|---|---|---|
| 9,457,322 | B2 | 10/2016 | Choi et al. |
| 2006/0219635 | A1 | 10/2006 | McCague et al. |
| 2008/0290031 | A1 | 11/2008 | Popa et al. |
| 2015/0013295 | A1* | 1/2015 | Uchiyama ............... B32B 27/30 442/364 |
| 2017/0001154 | A1* | 1/2017 | Marutani ................ B32B 27/06 |
| 2017/0225378 | A1* | 8/2017 | Platt .......................... B26F 1/02 |

FOREIGN PATENT DOCUMENTS

| | | | |
|---|---|---|---|
| JP | S56-054904 | U | 4/1981 |
| JP | 2014-124578 | A | 7/2014 |
| JP | 2017080709 | A * | 5/2017 |
| JP | 2017-532230 | A | 11/2017 |
| WO | 2006015034 | A2 | 2/2006 |
| WO | 2016022653 | A1 | 2/2016 |
| WO | 2018021387 | A1 | 2/2018 |
| WO | 2018215985 | A1 | 11/2018 |

OTHER PUBLICATIONS

China National Intellectual Property Administration ("CNIPA"); Second Office Action dated Oct. 25, 2023; PRC (China) Patent Application No. 202080050497.1.
Canadian Patent Office; Examiner's Report dated Dec. 12, 2023; Canadian Patent Application No. 3,145,296.
China National Intellectual Property Administration ("CNIPA"); First Office Action dated Mar. 20, 2023; PRC (China) Patent Application No. 202080050497.1.
European Patent Office (EPO); Communication Rule 62 EPC, the Supplementary European search report and the European search opinion; Patent Application No. 20839787.7 dated Jun. 15, 2023.
International Search Report and Written Opinion; PCT/US2020/040941; Oct. 30, 2020.

* cited by examiner

FLUOROPLASTIC SUPPORT MEMBRANE

CROSS-REFERENCE TO RELATED APPLICATIONS

This application is a national stage application, filed under 35 U.S.C. § 371, of International Patent Application No. PCT/US2020/040941 filed on Jul. 6, 2020, which claims the benefit of U.S. Provisional Application Ser. No. 62/873,374, filed Jul. 12, 2019, the entire disclosure of which is incorporated herein by reference for all purposes.

BACKGROUND

The field relates to filters, and more particularly to polymer support membranes for filter substrates or cartridges.

Filters are often used to separate particles or contaminants from fluids by passing fluid through a porous filter medium that captures the particles while permitting the fluid to pass through. Such fluid filtering is used extensively in the manufacturing of semiconductor components, superconductors, polymer products, medicinal products, mineral and metallurgical processing, petroleum refining water purification, emission control, and in food and beverage preparation.

The manufacturer of faster, more efficient semiconductor chips has demanded processing materials to be purer and purer. Impurities such as dust and individual molecules and ions of metal are now considered to be contaminants. Ultrapure filtration of fluids used in the semiconductor manufacturing process has forced the industry to abandon the use of any metal in filter construction. Filters are now constructed primarily from Perfluoroalkoxy Alkanes (PFA), a derivative of Teflon, one of the cleanest and inert polymers manufactured today. In fact, there are grades of PFA specifically designed for the use in semiconductor market. These resins are manufactured and cleaned to keep metals and by products of polymerization to an absolute minimum.

Filter members for use in cleaning semiconductor components typically include support sheets or membranes made of a fluoroplastic material. These sheets are often apertured to permit filtrate to pass through the sheets into underlying filter media. In some cases, the support sheet includes ribs spaced apart from each other to provide continuous flow channels bound by the ribs. One example of such a support sheet for a filter substrate can be found in commonly assigned EP Patent No. 3,177,447, the complete disclosure of which is hereby incorporated by reference in its entirely for all purposes.

Support sheets or membranes are often used in filters to provide structural support for the filter layer. Typically, a cross-flow pressure drop may be observed across a support membrane when filtering at a given rate, indicating an increase in the amount of force needed to push a fluid through the filter. Minimizing the cross-flow pressure drop across a given support membrane can decrease the operational costs of filtering.

Accordingly, it would be desirable to manufacture support membranes for filters that provide a minimal pressure drop when filtering at desirable flow rates.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

In one aspect, illustrative embodiments relate to a support membrane for a filter including a support sheet formed of a polymeric material that includes a substantially planar base section having opposed outer surfaces and a plurality of ribs spaced from each other and extending outwardly from at least one of the opposed outer surfaces. The ribs define continuous flow channels bound between adjacent ribs. The ratio of the height of the ribs to the height of the base section ranges from about 2:1 to about 5:1, preferably about 4:1. This relatively high aspect ratio between the ribs and base section improves the overall performance of the filter and decreases the cross-flow pressure drop of fluids filtered through the support membrane.

In certain embodiments, the support membrane is configured such that a cross-flow pressure drop when filtering fluids at a flow rate of 40 mL/min is about 1.0 PSI or less, preferably about 0.5 PSI or less. Minimizing the cross-flow pressure drop across the support membrane decreases the operational costs of filtering.

In certain embodiments, the support sheet together with the ribs has a thickness of about 2.5 to about 7.5 mils, preferably about 3-7 mils, and the height of the ribs above the base layer ranges from about 2 to about 6 mils.

The ribs preferably have a continuous outer surface extending from a first end to a second end, which are in contact with the outer surface of the base section. The continuous outer surface of each rib comprises opposing side surfaces that are substantially perpendicular to the outer surface of the base section, which increases the size or volume of the flow channels between the ribs. In an exemplary embodiment, the continuous outer surface of each rib is substantially D-shaped.

In certain embodiments, the support sheet is substantially porous, having a porosity value of at least 0.5, preferably at least 0.8, and more preferably about 0.86. This high porosity increases the flow of fluid through the support sheet, improving operation of the filter.

In another aspect, illustrative embodiments relate to a filter including a layer of filter media and at least one support sheet layer secured to the layer of filter media. The support sheet layer is formed of a polymeric material and includes a planar, continuous base section having opposed outer surfaces and spaced-apart ribs extending outwardly from at least one of the opposed outer surfaces. The spaced-apart ribs cooperate with an outer surface from which they extend to provide outer surface segments between adjacent ribs defining continuous flow channels bound by the adjacent spaced-apart ribs. The ratio of the height of the ribs to the height of the continuous base ranges from about 2:1 to about 5:1, preferably about 4:1.

In certain embodiments, the support sheet layer is configured such that a cross-flow pressure drop when filtering fluids at a flow rate of 40 mL/min is about 1.0 PSI or less, preferably about 0.5 PSI or less.

In certain embodiments, the support sheet layer together with the ribs has a thickness of about 2.5 to about 7.5 mils, preferably about 3-7 mils, and the height of the ribs above the base layer ranges from about 2 to about 6 mils.

The ribs preferably have a continuous outer surface extending from a first end to a second end, which are in contact with the outer surface of the base section. The continuous outer surface of each rib comprises opposing side surfaces that are substantially perpendicular to the outer surface of the base section, which increase the size or volume of the flow channels between the ribs. In an exemplary embodiment, the continuous outer surface of each rib is substantially D-shaped.

In certain embodiments, at least the base section of the support sheet layer is substantially porous, having a porosity value of at least 0.5, preferably at least 0.8, and more preferably about 0.86. This high porosity increases the flow of fluid through the support sheet, improving operation of the filter.

In another aspect, a filtration cartridge for semiconductor components is provided that includes a housing. The housing comprises a filter layer configured to filter contaminants from fluids flowing therethrough and at least one support sheet layer extending across the housing. The support sheet is formed of a polymeric material and has a substantially planar base section with opposed outer surfaces and ribs spaced from each other and extending outwardly from at least one of the opposed outer surfaces. The ribs define continuous flow channels bound by the adjacent spaced-apart ribs. A ratio of a height of the ribs to a height of the continuous base ranges from about 2:1 to about 5:1, preferably about 4:1.

It is to be understood that both the foregoing general description and the following detailed description are exemplary and explanatory only and are not restrictive of the description. Additional features will be set forth in part in the description which follows or may be learned by practice thereof.

BRIEF DESCRIPTION OF THE DRAWINGS

The accompanying drawings, which are incorporated in and constitute a part of this specification, illustrate several embodiments and together with the description serve to explain the principles of the devices and methods described herein.

DETAILED DESCRIPTION

Figure 1:
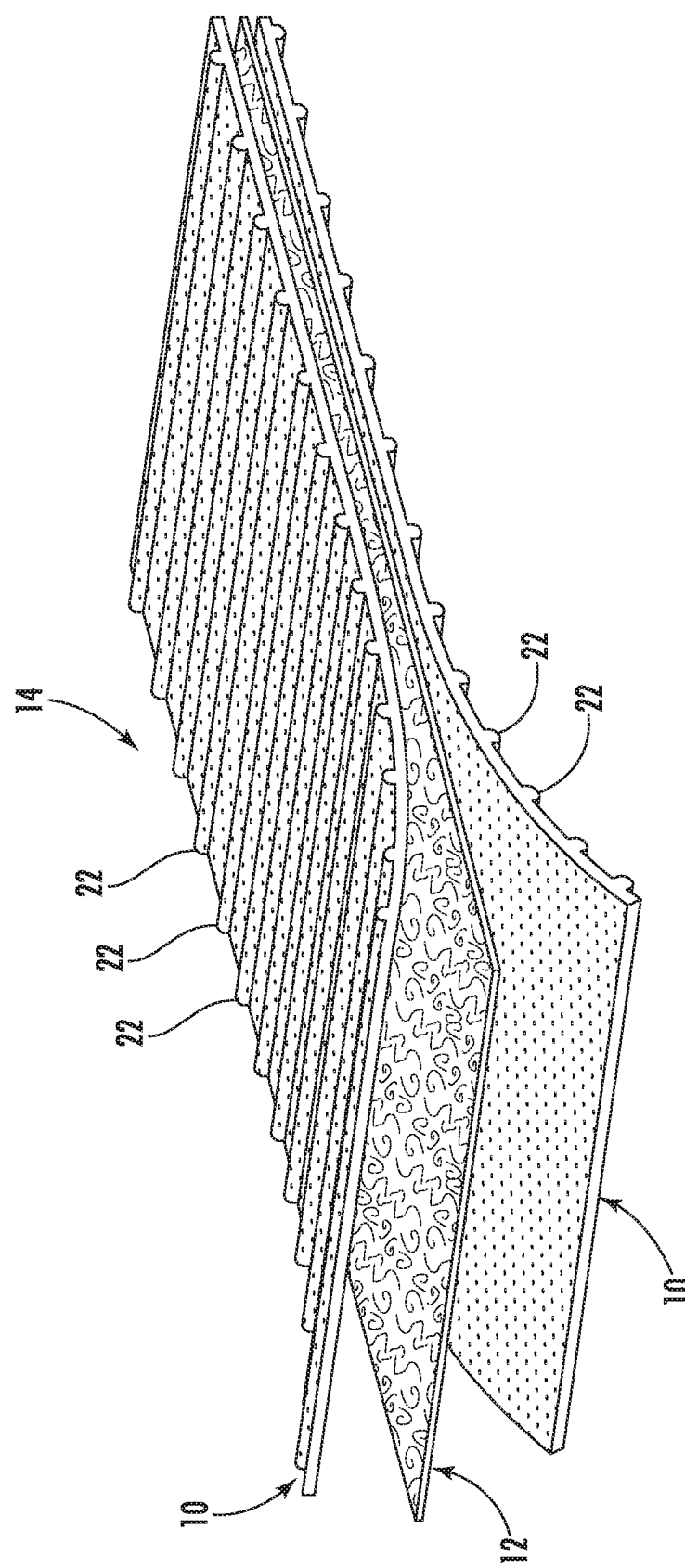
FIG. 1 is a schematic, isometric view showing a three-layer filter including a filter substrate sandwiched between two support sheets.

This description and the accompanying drawings illustrate exemplary embodiments and should not be taken as limiting, with the claims defining the scope of the present description including equivalents. Various mechanical, compositional, structural, and operational changes may be made without departing from the scope of this description and the claims, including equivalents. In some instances, well-known structures and techniques have not been shown or described in detail so as not to obscure the description. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

While the following is presented with respect to support membranes for use in fluid filtering for manufacture of semiconductors, it should be understood that the present semipermeable membranes may be readily adapted for use in any type of filtering process using a filter having at least one support membrane.

Reference throughout this application including the claims to the apertures being punched through the entire thickness thereof "in a predetermined pattern unaffected by the structure of the support sheet" means that the support sheet is not embossed or otherwise provided with slits or weakened regions that are intended to constitute the regions in which apertures are created or formed. The predetermined pattern of apertures in the present support membranes may very well be set, selected or determined by the structure of the ribbed sheet, but the structure of the ribbed sheet is not responsible for providing or establishing the predetermined pattern of apertures. In embodiments, the predetermined pattern of apertures is provided by a predetermined pattern of punch members in a punch press used to create the apertures in the ribbed sheet.

Reference throughout this application to "filter media" or "filter substrate" being a component of illustrative filter members can be of any desired configuration or composition for carrying out the desired filtering operation. For example, and not by way of limitation, the filter media can be either a single layer or a multilayer structure and can be formed from melt blown layers, spun bond layers, other non-woven layers and combinations thereof. Exemplary filter media are described, for example, in U.S. Pat. No. 9,457,322, the disclosures of which is incorporated by reference herein in its entirety.

Referring to FIG. 1, a composite filter member 14 in accordance with an illustrative embodiment includes an internal filter substrate 12 and one or more filter support members or membranes 10. Support members 10 may be formed from an extruded sheet of a thermoplastic polymeric material such as an extrudable fluoroplastic material, in embodiments a perfluoroalkoxy (PFA) copolymer made from co-monomers polytetrafluoroethylene and perfluoroalkyl vinyl ether. However, other polymeric materials such as fluoroplastics may be usable e.g., ethylenechlorotrifluoroethyle (ECTFE); ethylenetetrafluroethylene (ETFE) of polyvinylidene fluoride (PVDF).

Fluoroplastic material such as PFA is highly desirable for use in filters intended to clean semiconductor components and in other environments where extreme cleanliness is required and the possibility of contamination is minimized. In embodiments, illustrative support membranes are preferably designed to both direct fluids to be filtered along their surfaces and also for directing the fluids through the structure into the underlying filter substrate to remove undesired particulates from the filtrate.

As shown, support members 10 include ribs 22 disposed outwardly from the composite filter member 14. However, if desired, support members 10 can be reversed to position ribs 22 in engagement with internal filter substrate 12.

Figure 2A:
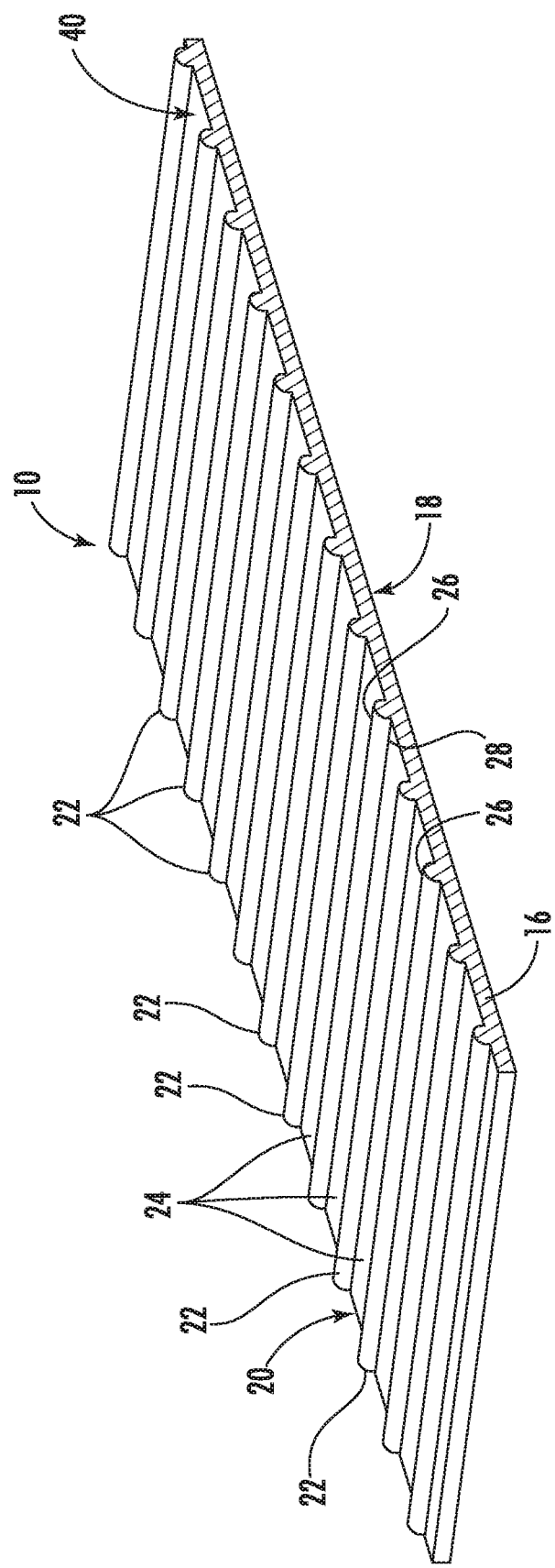
FIG. 2A is an isometric view of an embodiment of a support sheet in an intermediate stage of formation.
Figure 5A:
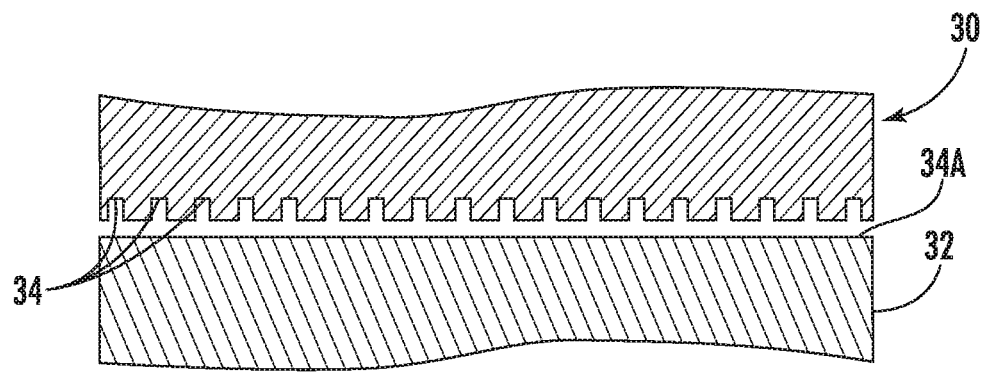
FIGS. 5A-5C show cooperating pattern rolls with different arrangements of pockets to vary the rib structure in the support membrane for forming the embodiments of the support membranes in FIGS. 2A-2C, respectively.

Referring to FIG. 2A, one embodiment of support member 10 is shown in an intermediate stage of formation; after being passed through a nip provided by opposed rolls 30,32; one roll, e.g., 30 having axially spaced-apart pockets 34 extending circumferentially around its periphery and co-operating with a smooth-surfaces, opposing roll 32 (see FIG. 5A). Thereafter, the support member 10 is set to be processed further.

Ribs 22 extend outwardly from an outer surface 24 of a planar, continuous base layer 16. Continuous base layer 16 has opposed outer surfaces 18, 20. Ribs 22 have an outer distal end 26 and an inner proximal end 28. The areas bound between adjacent ribs 22 and the outer surfaces 22 of continuous base layer 16 define continuous flow channels 40 through which fluid travels. In certain embodiments, the aspect ratio of the support members 10 is designed to be relatively high (i.e., a relatively thin base layer 16 compared with relatively high ribs 22), which increases the overall performance of the filter. In an exemplary embodiment, the ratio of the height of ribs 22 to the height of continuous base layer 16 may range from about 2:1 to about 5:1, preferably about 4:1.

The thickness of support members 10 and ribs 22 together may range from about 2.5 mils to about 7.5 mils, preferably between about 3-7 mils. The thickness of base layer 16 may range from about 0.5 mils to about 1.5 mils and the height of ribs 22 above base layer 16 ranges from about 2 mils to about 6 mils.

Figure 2B:
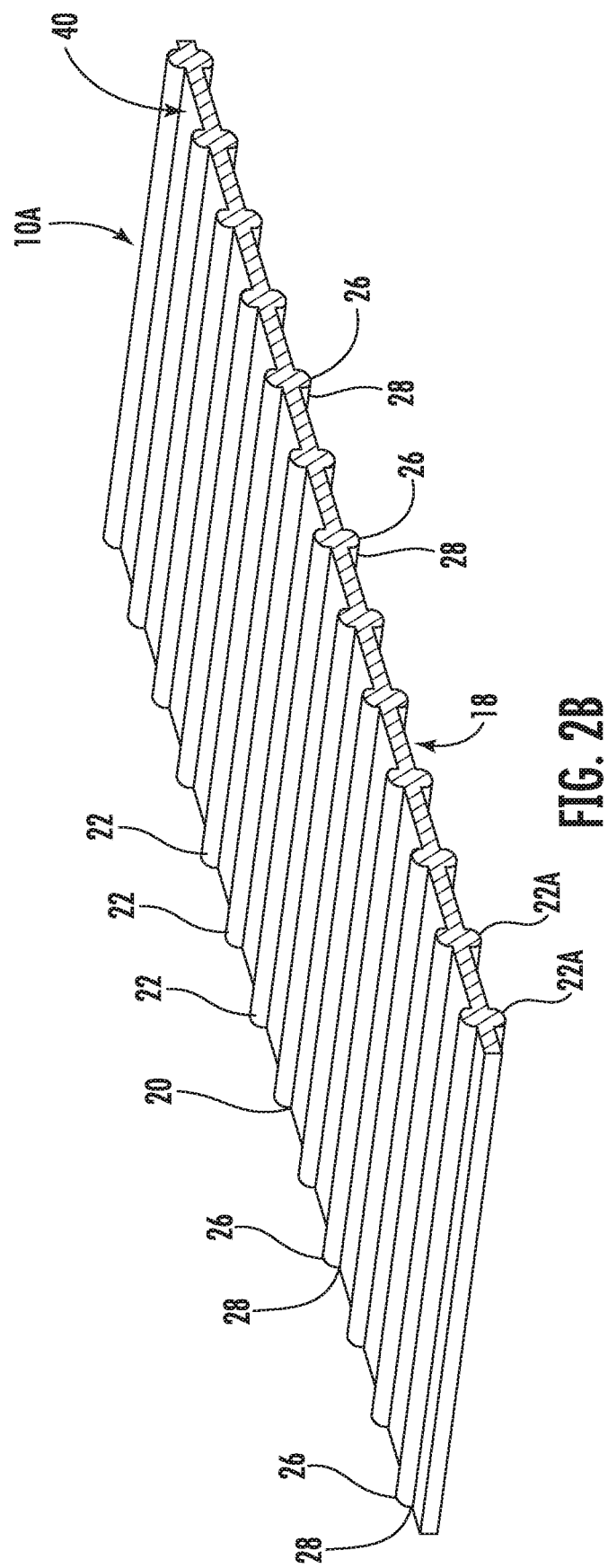
FIG. 2B is an isometric view of another embodiment of a support sheet in an intermediate stage of formation.
Figure 2C:
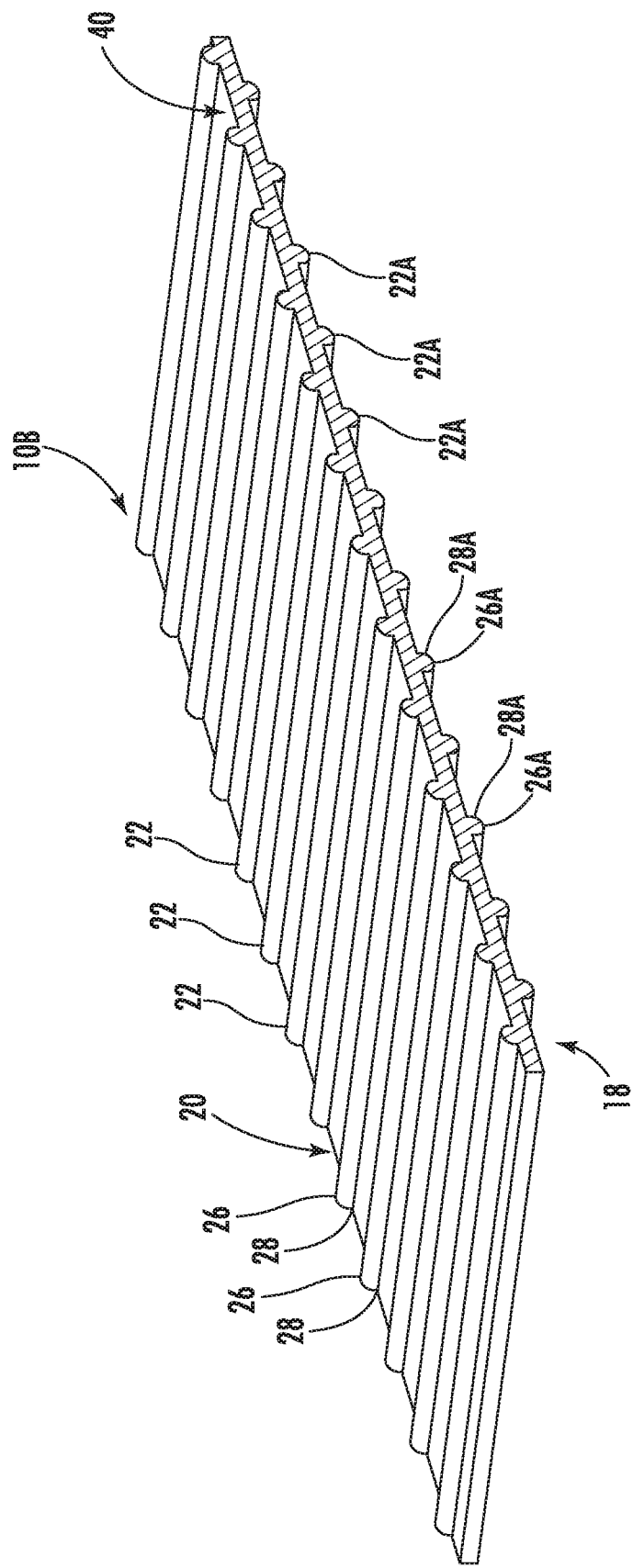
FIG. 2C is an isometric view of yet another embodiment of a support sheet in an intermediate stage of formation.

Referring now to FIGS. 2B and 2C, an alternative embodiment of support member 10A includes spaced-apart ribs 22A disposed outwardly from support member 10A on the opposite side from ribs 22. Ribs 22A may be in vertical alignment with ribs 22 (as illustrated in FIG. 2B), or transversely offset with respect to ribs 22 (as shown in FIG. 2C). It should be noted that the arrangement of ribs 22A are formed with the use of pattern rolls 30A, 32A and 30B, 32B shown in FIGS. 5B and 5C.

Other arrangements can be provided. For example, and not by way of limitation, ribs 22 and/or ribs 22A can be formed in a skewed pattern across the sheet as the sheet is passed through the nip of a specially designed set of pattern rolls (not shown).

It should be noted that the ribbed filter support members 10, 10A and 10B, as well as other illustrative ribbed support members in accordance with illustrative embodiments, are not pleated structures having projections including underlying recesses complimentary in shape to the projections. In fact, ribbed structures 10, 10A and 10B all have a continuous, planar base section. Also, these ribbed structures do not include a predetermined pattern of weakened regions or slits in the originally formed sheet to affect the location or pattern of apertures that subsequently is formed therein.

Referring now to FIG. 4, ribs 22 and 22A preferably have a substantially D-shaped cross-section, having sidewalls 42, 44 that are substantially perpendicular to surface 20 of base layer 16. This configuration increases the flow area of channels 40, which may have length of about 0.025 to about 0.055 inches, preferably about 0.025 to about 0.040 inches.

Figure 4A:
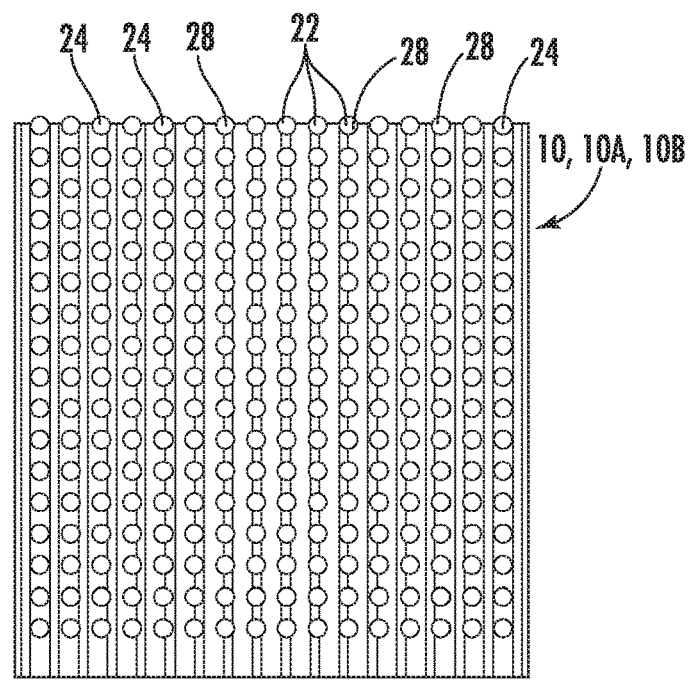
FIG. 4A is a plan view of an illustrative support membrane illustrating the arrangement of ribs and apertures in the structure without stretching the sheet.
Figure 4B:
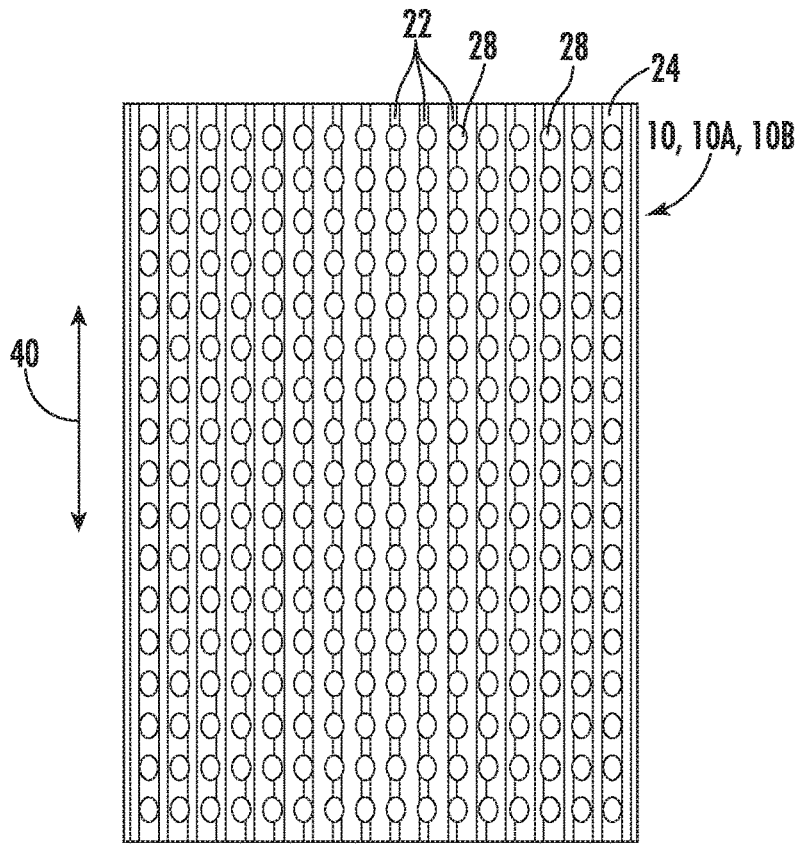
FIG. 4B is a plan view of an illustrative support membrane after the support membrane has been stretched in the machine direction of formation to elongate the apertures.

As shown in FIGS. 4A and 4B, channels 40 may include a plurality of apertures 28. Apertures are preferably round in shape although it will be recognized that other shapes are possible, such as square, rectangular, triangular and the like. After formation of the ribs 22, 22A in the extruded substrate, the substrate is set; preferably without either longitudinal or transverse stretching. This cast substrate can then be wound into a roll and subsequently unwound and directed through a punch press to form apertures 28 through the Z-direction in a desired, predetermined pattern (FIG. 4A). Alternatively, the sheet, after being set, can be directed in a continuous operation through a punch press to form the predetermined pattern of apertures 28 therein. This predetermined pattern can provide apertures 28 extending both through channel sections, e.g., 24 of the substrate and ribbed sections, e.g., 22 of the substrate, as desired.

Figure 3:
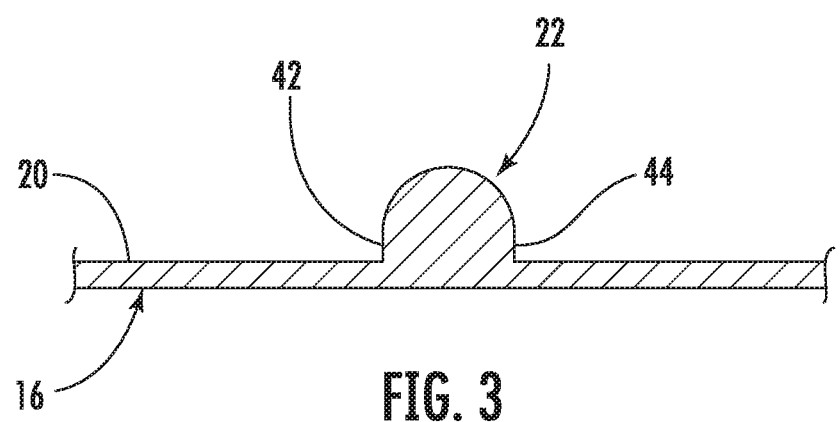
FIG. 3 is a cross-sectional view of one of the ribs of an illustrative support sheet.

Referring to FIG. 4B, after aperturing, the filter support members can be stretched in the machine direction, as indicated by the double-headed arrow 40, to elongate the apertures 28 for providing greater open area for passage of the fluid to be filtered by the filter media or substrate 12. This greater open area is evident by comparing FIG. 3B with the non-elongated filter support member shown in FIG. 3A.

In an alternative embodiment, the support membrane 10 may be porous (i.e., rather than, or in addition to, having apertures 28). In this embodiment, the additional fluid flow can be accomplished with a substantially porous support membrane. In an exemplary embodiment, the support membrane has a porosity value of at least 0.5 or 50%, preferably at least 0.8 or 80% and more preferably about 0.86 or 86%. Porosity value is defined as the nonsolid or pore-volume fraction of the total volume of the material.

The present support membranes for filters may be prepared by any methods known by those of ordinary skill in the art. For example, illustrative support membranes may be made by extruding a thermoplastic, fluoroplastic material to form of a sheet and then passing the sheet through a nip region provided by opposed rollers; at least one of the rollers having an outer surface with counter-sunk grooves. Counter-sunk grooves in one roller are aligned with an outer surface or counter-sunk grooves of the other roller in the nip region to form a ribbed sheet having ribs upstanding from at least one surface of the sheet. Alternatively, ribs may be formed during the extrusion process or known methods of embossing. Once the ribs are formed the support membrane may be wound into a roll and subsequently unwound and directed through a press to form apertures through the Z-direction thereof in a desired, predetermined pattern. Alternatively, after being set, the support membrane can be directed in a continuous operation through a punch press to form the predetermined pattern of apertures therein, as best seen in FIG. 4A. Optionally, the support membrane can be stretched in the machine direction (indicated by the double-headed arrow in FIG. 4B) to elongate the apertures for providing greater open area for passage of fluid to be filtered by, for example, a filter layer or substrate.

Referring now to FIG. 5A, in one embodiment, the substrate for the filter support member 10 is extruded in a molten state from a conventional extruder into a substantially planar sheet that is passed through the nip of opposed rolls illustrated schematically and in fragmentary view at 30, 32 to form the ribs 22 projecting outwardly from planar base section 16 thereof.

The roll is a patterned roll with counter sunk grooves 34 circumferentially continuous about the periphery of the roll and spaced-apart from each other along the axial extent of the roll. However, grooves or pockets can also be formed discontinuously about the circumference and/or arranged at an acute angle, e.g., skewed to the rotational axis of the roll.

FIG. 5A illustrates an arrangement of cooperating rolls 30, 32, when ribs 22 are only intended to be formed one side of the base. As is apparent, the roll 32 opposed to roll 30 has a continuous peripheral surface 34A free of pockets, projections or other three dimensional patterns.

Figure 5B:
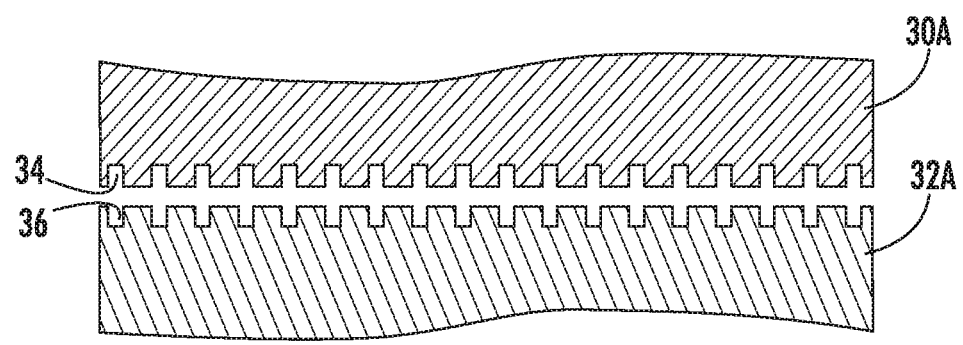

FIG. 5B illustrates an arrangement of cooperating rolls 30A, 32A for forming ribs 22 and 22A in alignment with each other and extending from opposing surfaces 20, 18 of the support member 10A (shown in FIG. 2B). As shown, opposed rolls 30A, 32A have circumferential, countersunk grooves 34, 36 in axial alignment with each other to form the ribs 22, 22A.

Figure 5C:
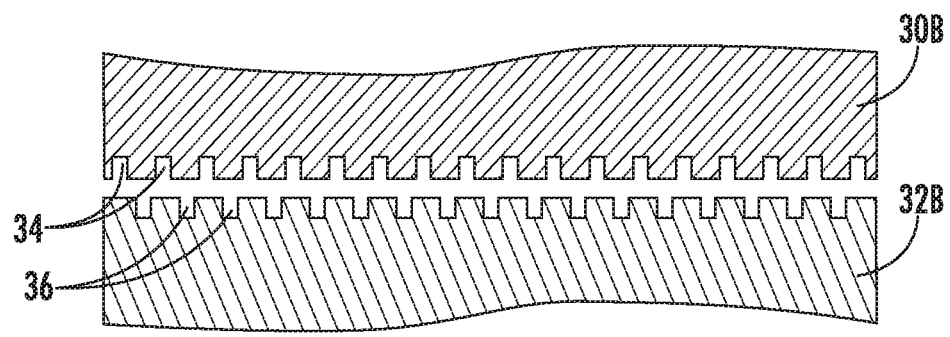

Alternatively, the grooves 36 in roll 32B can be out of axial alignment with grooves 34 in rolls 30B as shown in FIG. 5C to provide ribs 22 that are out of alignment with ribs 22A (as shown in FIG. 2C).

In preferred, non-limiting embodiments, support member 10 includes about 10-236 ribs per 10 cm (i.e., 4-60 ribs per inch) on one side, more preferably about 40-118 ribs per 10 cm (10-30 ribs per inch) and even more preferably about 79 ribs per 10 cm (20 ribs per inch). The spacing of the ribs may be asymmetrical is so desired.

Illustrative support membranes may be used within a filter cartridge configured to filter contaminates from fluids flowing therethrough. Typically, a filter cartridge includes filter housing containing a filter medium having a support sheet or support membrane on one or both sides of the filter layer. FIG. 1 depicts two support membranes 10 in accordance with illustrative embodiments supporting an internal filter medium 12 to form a composite filter 14. Exemplary filter cartridges are shown, for example, in U.S. Pat. No. 7,347,937 the disclosure of which is incorporated by reference herein in its entirety.

Testing of the cross-flow pressure drop along exemplary support membranes can be conducted using techniques within the purview of those skilled in the art.

Example 1

A support membrane having ribs that are substantially D-Shaped was prepared in accordance with the method described above using a PFA copolymer composition of poly(heptafluoropropyl-trifluorovinylether/tetrafluoroethylene. The ribs of the support membrane were about 5.5 mils in height. The cross-flow pressure drop along the support membrane at 40 mL/minute was 1.0 PSI.

Example 2

A second support membrane having substantially similar properties the support membrane of EXAMPLE 1 was manufactured and a punch press was used to perforate the support membrane to form many apertures throughout the membrane. The cross-flow pressure drop along the support membrane at 40 mL/minute was measured to be 0.5 PSI.

Hereby, all issued patents, published patent applications, and non-patent publications that are mentioned in this specification are herein incorporated by reference in their entirety for all purposes, to the same extent as if each individual issued patent, published patent application, or non-patent publication were specifically and individually indicated to be incorporated by reference.

While several embodiments herein have been shown in the drawings, it is not intended that the description be limited thereto, as it is intended that the description be as broad in scope as the art will allow and that the specification be read likewise. Therefore, the above description should not be construed as limiting, but merely as exemplifications of presently disclosed embodiments. Thus the scope of the embodiments should be determined by the appended claims and their legal equivalents, rather than by the examples given.

Persons skilled in the art will understand that the devices and methods specifically described herein and illustrated in the accompanying drawings are non-limiting exemplary embodiments. The features illustrated or described in connection with one exemplary embodiment may be combined with the features of other embodiments. Various alternatives and modifications can be devised by those skilled in the art without departing from the description. Accordingly, the present description is intended to embrace all such alternatives, modifications and variances. As well, one skilled in the art will appreciate further features and advantages based on the above-described embodiments. Accordingly, the present description is not to be limited by what has been particularly shown and described, except as indicated by the appended claims.

What is claimed is:

1. A support membrane for a filter comprising:
a support sheet formed of a fluoroplastic copolymer material and including a substantially planar base section having opposed outer surfaces and a plurality of ribs spaced from each other and extending outwardly from at least one of the opposed outer surfaces, the ribs defining continuous flow channels bound by the ribs, the fluoroplastic copolymer material being a perfluoroalkoxy copolymer comprising co-monomers polytetrafluoroethylene and perfluoroalkyl vinyl ether;
wherein the ribs are D-shaped and have a continuous outer surface extending from a first end to a second end, the first and second ends being in contact with the at least one of the opposed outer surfaces, the continuous outer surface of each rib having opposing side surfaces that are substantially perpendicular to the at least one of the opposed outer surfaces, and the continuous outer surface of each rib forming a curved surface connecting the two side surfaces; and
wherein a ratio of a height of the ribs to a height of the base section ranges from 2:1 to 5:1.

2. The support membrane of claim 1, wherein a cross-flow pressure drop when filtering fluids at a flow rate of 40 mL/min is 1.0 PSI or less.

3. The support membrane of claim 1, wherein a cross-flow pressure drop when filtering fluids at a flow rate of 40 mL/min is 0.5 PSI or less.

4. The support membrane of claim 1, wherein a thickness of the support sheet ranges from 2.5 to 7.5 mils.

5. The support membrane of claim 1, wherein the height of the ribs ranges from about 2 to 6 mils.

6. The support membrane of claim 1, wherein the ratio of the height of the ribs to the height of the base section is 4:1.

7. The support membrane of claim 1, wherein the support sheet is porous and has a porosity value of at least 0.8.

8. A support membrane for a filter comprising:

a support sheet formed of a fluoroplastic copolymer material and including a substantially planar base section having opposed outer surfaces and a plurality of ribs spaced from each other and extending outwardly from at least one of the opposed outer surfaces, the ribs defining continuous flow channels bound by the ribs, the fluoroplastic copolymer material being a perfluoroalkoxy copolymer comprising co-monomers polytetrafluoroethylene and perfluoroalkyl vinyl ether;

wherein at least one of the ribs or the base section includes apertures to form a porous support sheet; and wherein the ribs are D-shaped and have a continuous outer surface extending from a first end to a second end, the first and second ends being in contact with the at least one of the opposed outer surfaces, wherein the continuous outer surface of each rib has opposing side surfaces that are substantially perpendicular to the at least one of the opposed outer surfaces, and the continuous outer surface of each rib forms a curved surface connecting the two side surfaces.

9. A filtration cartridge comprising:

a housing, the housing including;

a filter layer configured to filter contaminants from fluids flowing therethrough; and at least one support sheet layer extending across the housing, the at least one support sheet being formed of a fluoroplastic copolymer material and including a substantially planar base section having opposed outer surfaces and ribs spaced from each other and extending outwardly from at least one of the opposed outer surfaces, the ribs defining continuous flow channels bound by the adjacent spaced-apart ribs, the fluoroplastic copolymer material being a perfluoroalkoxy copolymer comprising co-monomers polytetrafluoroethylene and perfluoroalkyl vinyl ether;

wherein a ratio of a height of the ribs to a height of the continuous base ranges from 2:1 to 5:1;

wherein the ribs are D-shaped and have a continuous outer surface extending from a first end to a second end, the first and second ends being in contact with the at least one of the opposed outer surfaces, wherein the continuous outer surface of each rib has opposing side surfaces that are substantially perpendicular to the at least one of the opposed outer surfaces, and the continuous outer surface of each rib forms a curved surface connecting the two side surfaces.

10. The filtration cartridge of claim 9, wherein the ratio of the height of the ribs to the height of the base section is 4:1.

11. The filtration cartridge of claim 9, wherein a cross-flow pressure drop when filtering fluids at a flow rate of 40 mL/min is 1.0 PSI or less.

12. The filtration cartridge of claim 9, wherein a cross-flow pressure drop when filtering fluids at a flow rate of 40 mL/min is 0.5 PSI or less.

13. The filtration cartridge of claim 9, wherein the support sheet is porous and has a porosity value of at least 0.8.

* * * * *